United States Patent
Biber (10) Patent No.: US 12,429,882 B2
(45) Date of Patent: Sep. 30, 2025

(54) COMPUTER-IMPLEMENTED METHOD FOR CREATING AN ENVIRONMENT MAP FOR OPERATING A MOBILE AGENT

(71) Applicant: Robert Bosch GmbH, Stuttgart (DE)

(72) Inventor: Peter Biber, Ammerbuch (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/770,215

(22) PCT Filed: Sep. 24, 2020

(86) PCT No.: PCT/EP2020/076742
§ 371 (c)(1),
(2) Date: Apr. 19, 2022

(87) PCT Pub. No.: WO2021/089231
PCT Pub. Date: May 14, 2021

(65) Prior Publication Data
US 2022/0374025 A1    Nov. 24, 2022

(30) Foreign Application Priority Data
Nov. 7, 2019   (DE) .................. 10 2019 217 160.5

(51) Int. Cl.
*G05D 1/00* (2024.01)
*G01C 21/20* (2006.01)

(52) U.S. Cl.
CPC ......... *G05D 1/0274* (2013.01); *G01C 21/206* (2013.01); *G05D 1/0214* (2013.01)

(58) Field of Classification Search
None
See application file for complete search history.

(56) References Cited

U.S. PATENT DOCUMENTS

2010/0070078 A1    3/2010    Kong et al.
2010/0223031 A1*   9/2010    Vincent .................. G06F 30/13
                                                            901/1

(Continued)

FOREIGN PATENT DOCUMENTS

CN    104850615 A  *  8/2015
CN    107036594 A     8/2017

(Continued)

OTHER PUBLICATIONS

Wang L, Wu Z. RGB-D SLAM with Manhattan Frame Estimation Using Orientation Relevance. Sensors (Basel). Mar. 1, 2019;19(5):1050. doi: 10.3390/s19051050. PMID: 30832227; PMCID: PMC6427174. (Year: 2019).*

(Continued)

*Primary Examiner* — Faris S Almatrahi
*Assistant Examiner* — Selena M Jin
(74) *Attorney, Agent, or Firm* — NORTON ROSE FULBRIGHT US LLP (57) ABSTRACT

A computer-implemented method for operating a mobile agent in an environment on the basis of a pose of the mobile agent. The location of the mobile agent is determined by way of the following steps in order to operate the mobile agent: capturing sensor data regarding walls and/or objects located in an environment, wherein the sensor data indicate the orientation and distance of the walls and/or objects in an agent-based agent coordinate system; establishing the pose of the mobile agent in the environment using a SLAM algorithm while taking account of a Manhattan orientation.

4 Claims, 4 Drawing Sheets

(56) References Cited

U.S. PATENT DOCUMENTS

| | | | |
|---|---|---|---|
| 2014/0129027 A1 | 5/2014 | Schnittman | |
| 2014/0320661 A1* | 10/2014 | Sankar | H04N 23/62 |
| | | | 348/158 |
| 2016/0059418 A1 | 3/2016 | Nakamura et al. | |
| 2017/0343356 A1* | 11/2017 | Roumeliotis | H04W 4/027 |
| 2018/0211164 A1 | 7/2018 | Bazrafkan et al. | |
| 2018/0299899 A1 | 10/2018 | Suvarna et al. | |
| 2019/0128677 A1 | 5/2019 | Naman | |
| 2019/0236797 A1* | 8/2019 | Thyagharajan | G06T 7/593 |
| 2019/0251386 A1 | 8/2019 | Piekniewski et al. | |
| 2020/0159228 A1* | 5/2020 | Zhong | G05D 1/0212 |
| 2020/0273190 A1* | 8/2020 | Ye | G06T 7/579 |
| 2020/0282566 A1* | 9/2020 | Yi | G06T 5/30 |
| 2020/0388004 A1* | 12/2020 | Zhang | G06T 7/337 |

FOREIGN PATENT DOCUMENTS

| | | |
|---|---|---|
| CN | 107390681 A | 11/2017 |
| DE | 10319513 A1 | 5/2004 |
| EP | 3196726 B1 | 1/2020 |

OTHER PUBLICATIONS

Pedrosa, E., Pereira, A. & Lau, N. A Non-Linear Least Squares Approach to SLAM using a Dynamic Likelihood Field. J Intell Robot Syst 93, 519-532 (2019). https://doi.org/10.1007/s10846-017-0763-7 (Year: 2017).*

Liu, Translation of CN-104850615-A, 2015 (Year: 2015).*

P. F. Proença and Y. Gao, "Fast Cylinder and Plane Extraction from Depth Cameras for Visual Odometry," 2018 IEEE/RSJ International Conference on Intelligent Robots and Systems (IROS), Madrid, Spain, 2018, pp. 6813-6820, doi: 10.1109/IROS.2018.8593516. (Year: 2018).*

G. Grisetti, R. Kümmerle, C. Stachniss and W. Burgard, "A Tutorial on Graph-Based SLAM," in IEEE Intelligent Transportation Systems Magazine, vol. 2, No. 4, pp. 31-43, winter 2010, doi: 10.1109/MITS.2010.939925. (Year: 2010).*

International Search Report for PCT/EP2020/076742, Issued Nov. 19, 2020.

Beasley et al., "Accurate On-Line 3D Occupancy Grids Using Manhattan World Constraints," IEEE/RSJ International Conference on Intelligent Robots and Systems, 2012, pp. 1-8. <https://dellaert.github.io/files/Peasley12iros.pdf> Downloaded Apr. 18, 2022.

Olson, "Robust and Efficient Robotic Mapping," Phd Dissertation, Massachusetts Institute of Technology, Cambridge, MA, USA, 2008, pp. 1-129. https://april.eecs.umich.edu/pdfs/olson2008phd.pdf> Downloaded Apr. 18, 2022.

Grisetti et al., "A Tutorial on Graph-Based SLAM," IEEE Intelligent Transportation Systems Magazine, 2010, pp. 1-11. <http://www2.informatik.uni-freiburg.de/~stachnis/pdf/grisetti10titsmag.pdf> Downloaded Apr. 18, 2022.

Biber et al., "The Normal Distributions Transform: A New Approach to Laser Scan Matching," Proceedings 2003, IEEE/RSJ International Conference on Intelligent Robots and Systems (IROS 2003), vol. 3, 2003, pp. 1-6. <https://citeseerx.ist.psu.edu/viewdoc/download?doi=10.1.1.10.7059&rep=rep1&type=pdf> Downloaded Apr. 18, 2022.

Agarwal et al., "Robust Map Optimization Using Dynamic Covariance Scaling," 2013 IEEE International Conference on Robotics and Automation, 2013, pp. 1-8. <http://www2.informatik.uni-freiburg.de/~spinello/agarwallCRA13.pdf> Downloaded Apr. 18, 2022.

Guo et al., "RGB-D SLAM Using Point-Plane Constraints for Indoor Environments," Sensors, vol. 19, No. 12, 2721, 2019, pp. 1-16. <https://www.ncbi.nlm.nih.gov/pmc/articles/PMC6630892/pdf/sensors-19-02721.pdf> Downloaded Apr. 18, 2022.

Flint et al., "Growing Semantically Meaningful Models for Visual SLAM," Teee Conference on Computer Vision and Pattern Recognition (CVPR), IEEE, 2010, pp. 1-8. < https://www.researchgate.net/profile/Alex-Flint/publication/221364258_Growing_semantically_meaningful_models_for_visual_SLAM/links/5a9da2200f7e9bc35fcfc2ea/Growing-semantically-meaningful-models-for-visual-SLAM.pdf>.

Phi-Hung et al., "Dense Piecewise Planar RGB-D SLAM for Indoor Environments," 2017 IEEE/RSJ International Conference on Intelligent Robots and Systems (IROS), IEEE, 2017, pp. 1-8. <https://arxiv.org/pdf/1708.00514.pdf> Downloaded Apr. 18, 2022.

Peasley, "Large Scale 3D Mapping of Indoor Environments Using a Handheld RGBD Camera," Clemson University, Tigerprints, 2013, pp. 1-146. <https://tigerprints.clemson.edu/cgi/viewcontent.cgi?article=2229&context=all_dissertations> Downloaded Apr. 18, 2022.

Hong, et al.: "How Generative Adversaria! Networks and Their Variants Work: An Overview," arXiv:1711.05914v10, (2019), pp. 1-41.

Lin, et al.: "PacGAN: The power of two samples in generative adversarial networks," arXiv:1712.04086v3 [cs.LG], (2018), pp. 1-49.

Yang, et al.: "Real-to-Virtual Domain Unification for End-to-End Autonomous Driving," arXiv:1801.03458v2 [cs.CV], (2018), pp. 1-16.

\* cited by examiner

COMPUTER-IMPLEMENTED METHOD FOR CREATING AN ENVIRONMENT MAP FOR OPERATING A MOBILE AGENT

FIELD

The present invention relates to the field of autonomous control of a mobile agent within a movement region. In particular, the present invention relates to methods for determining the location of a mobile agent in an environment.

BACKGROUND INFORMATION

Mobile agents are used for many applications. In this context, the mobile agent is supposed to move autonomously in an environment having boundaries (walls) and obstacles (objects). Mobile agents of this kind can, for example, include a robot, a vehicle, an autonomous cleaning robot, an autonomous lawnmower, and the like.

The ability to determine an exact pose (position and orientation) of a mobile agent in an environment defined by sensor data, and to determine an environment map assigned to the exact pose, forms the basis for trajectory planning of a movement path within the environment.

A conventional approach for creating an environment map provides for the use of an environment-capturing sensor system of the mobile agent, which sensor system can comprise, for example, a LiDAR system, a camera, an inertial sensor system, an odometry sensor system, and the like. To create an environment map, the mobile agent is generally controlled or moved automatically and evaluates the sensor data from the environment-capturing sensor system in order to create an environment map.

A conventional method for creating an environment map provides for applying a so-called SLAM algorithm, which processes the recorded data from the environment-capturing sensor system and determines the pose of the mobile agent therefrom and establishes a corresponding environment map.

SUMMARY

What is provided according to the present invention is a method for determining the location of a mobile agent within an environment, as well as a device for determining the location of a mobile agent, a device for controlling a mobile agent in an environment, and a mobile agent.

Example embodiments of the present invention are disclosed herein.

What is provided according to a first aspect of the present invention is a method for operating a mobile agent in an environment on the basis of a pose of the mobile agent. In accordance with an example embodiment of the present invention, the location of the mobile agent is determined by way of the following steps:
- capturing sensor data regarding walls and/or objects located in an environment, the sensor data indicating the orientation and distance of the walls and/or objects in an agent-based agent coordinate system;
- establishing the pose of the mobile agent in the environment using a SLAM algorithm while taking account of a Manhattan orientation.

A fundamental drawback of the SLAM algorithm for determining the location of a mobile agent, i.e., for determining an absolute pose of the mobile agent within the environment, is that it accumulates drift of the captured sensor data. Due to the couplings, in particular the capturing error in relation to the established orientation causes a significant drift of the coupled position of the mobile agent. The orientation drift can be compensated for by direct measurements of the orientation, but these kinds of direct measurements of the orientation are generally only possible by way of compass measurements, which are not available in many situations, particularly in applications in buildings or in environments that are especially affected by stray magnetic fields.

The above method provides for combining the SLAM algorithm with Manhattan world assumptions. The essence of the Manhattan world concept is that a plurality of artificial environments have regular structures, in particular that a plurality of walls are parallel or perpendicular to one another and that walls typically extend in a straight line over relatively long distances and are planar. For example, the Manhattan world concept is described in the paper B. Beasley et al., "Accurate On-Line 3D Occupancy Grids Using Manhattan World Constraints," 2012, IEEE/RSJ International Conference on Intelligent Robots and Systems, Vilamoura, pp. 5283-5290.

In addition, the SLAM algorithm can provide for the minimization of an error function that is dependent on measurement errors in the sensor data and on the Manhattan orientation.

According to a specific embodiment of the present invention, the SLAM algorithm can correspond to a graph-based SLAM algorithm based on a SLAM graph having nodes and edges, the SLAM graph having pose nodes, which each indicate a pose of the mobile agent as established from the sensor data, and transformation edges between every two pose nodes, the transformation edges indicating a pose change, established from the sensor data, between the poses assigned to every two pose nodes, a Manhattan node and at least one Manhattan edge being added between the Manhattan node and one of the pose nodes depending on the Manhattan orientation.

In addition, the SLAM algorithm can include an error function, which is determined from the SLAM graph and takes account of the error probabilities assigned to the nodes and edges, which establishes corrected poses assigned to the nodes of the SLAM graph.

Basically, the method in accordance with the present invention provides for an improvement to the conventional SLAM algorithm for 2D environments. A conventional SLAM algorithm can be designed as a graph-based SLAM algorithm and provide for the creation of a graph that has pose nodes and transformation edges between every two pose nodes. The pose nodes represent a pose of the mobile agent as captured by the environment-capturing sensor system, and the transformation edges represent a measured pose change between two different poses of the mobile agent. The pose is indicated in relation to a reference coordinate system which is fixed in relation to the environment.

Owing to noise or other measurement errors, it is not possible to resolve the graph exactly such that the poses of the mobile agent that are indicated by the pose nodes are consistent with the measured movements of the mobile agent that are indicated by the transformation edges. Instead, the established poses and movements are indicated together with an error probability, and an error function, which is added up over all the transformation edges, is minimized in order to determine the exact poses of the mobile agent. The minimization is done in particular using conventional optimization methods, for example Gauss-Newton or Levenberg-Marquardt.

Further nodes and edges can be added to the graph on the basis of the Manhattan world concept. For each establishment of a valid Manhattan orientation in a capturing step, a Manhattan node and a Manhattan edge can be inserted into the SLAM graph between one of the pose nodes and the relevant Manhattan node. The subsequent optimization algorithm for minimizing the error then uses the additional boundary conditions predefined by the Manhattan orientation in order to establish the poses of each pose node. The reference coordinate system can then be aligned with the Manhattan orientation.

The above method makes it possible to detect a Manhattan orientation in each capturing cycle in order to establish a Manhattan orientation as an angle in the range from −45° to +45°.

In particular, the above method in accordance with an example embodiment of the present invention does not require any reference to a preceding capturing cycle and can also be applied in environments that only correspond to a Manhattan world in part. By explicitly depicting the Manhattan orientation, it is possible to align the reference coordinate system with the Manhattan orientation in order to thus provide an environment map aligned with the reference coordinate system. Owing to the continual re-assessment of the sensor data, the process for finding equivalences to preceding capturing cycles is omitted.

In addition, a point set can be determined from the sensor data, which point set indicates the coordinates of the captured walls and/or objects, the points in the point set being combined to form adjacent local cells, a Manhattan normalization being applied to those cells that have a cell orientation having a straight-line or 90° structure, the Manhattan orientation being determined depending on a dominant orientation of straight-line structures in the local cells.

In particular, to determine the dominant orientation of the cells for each cell orientation of a cell, a similarity to all other cell orientations can be established, and a similarity measure (e.g., as an L2 distance) can be established for each cell, in particular as a sum of the similarities of the respective cell in relation to the other cells, the Manhattan orientation corresponding to a cell orientation of one of the cells that is selected according to the similarity measure, the similarity measure of said cell in particular being a maximum.

In addition, the similarities can be determined depending on a Manhattan-normalized orientation difference between two of the cell orientations in each case, the similarities being established in particular depending on an exponential function of the negative Manhattan-normalized difference.

It can be provided that the determined Manhattan orientation is taken into account only when more than a predefined number of cell orientations of the cells are located within a Manhattan-normalized orientation difference in relation to the determined Manhattan orientation.

According to a specific embodiment, an environment map can be established using the current pose of the mobile agent, the mobile agent being operated depending on the environment map. For example, the environment map and the pose of the mobile agent can be used for trajectory planning according to a trajectory planning problem.

What is provided according to a further aspect of the present invention is a device, in particular a control unit, for operating a mobile agent in an environment on the basis of a pose of the mobile agent, the device being configured to determine the location of the mobile agent by way of the following steps:

capturing sensor data regarding walls and/or objects located in an environment, the sensor data indicating the orientation and distance of the walls and/or objects in an agent-based agent coordinate system;

establishing the pose of the mobile agent in the environment using a SLAM algorithm while taking account of a Manhattan orientation.

What is provided according to a further aspect of the present invention is a mobile agent comprising the above device, an environment-capturing sensor system for providing the sensor data, and a movement actuator system configured to move the mobile agent.

BRIEF DESCRIPTION OF THE DRAWINGS

Specific embodiments will be explained in more detail below on the basis of the figures.

DETAILED DESCRIPTION OF EXAMPLE EMBODIMENTS

Figure 1:
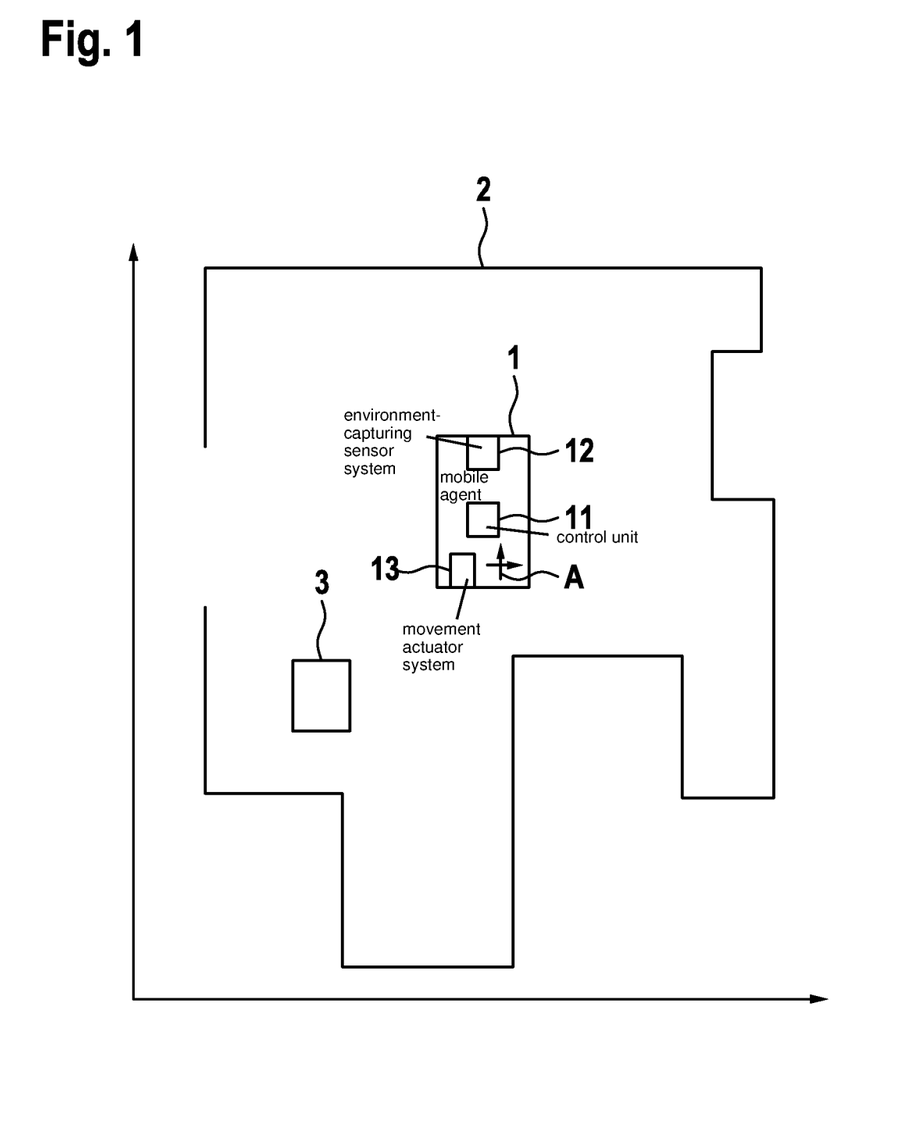
FIG. 1 is a schematic illustration of a mobile agent within an environment to be captured.

FIG. 1 is a schematic illustration of a mobile agent 1 in an environment defined by walls 2 and objects 3. The environment corresponds to a typical environment, as is common for internal spaces, factory buildings, or urban areas, and has walls and/or object edges extending in parallel with one another and/or perpendicularly to one another.

The mobile agent 1 has a control unit 11 for controlling the mobile agent 1. In addition, the mobile agent 1 has an environment-capturing sensor system 12 for capturing the direction and the distance from surrounding walls and objects 2, 3 in relation to an agent coordinate system A. In addition, the mobile agent 1 has a movement actuator system 13 for moving the mobile agent 1 within the environment in accordance with a function to be performed.

The environment sensor system 12 can have at least one of the following sensor apparatuses: a LiDAR apparatus, a radar apparatus, a laser scanning apparatus, a camera, an inertial sensor system, an odometry sensor system, and the like. The sensor data are processed in the control unit 11, in accordance with a pre-processing depending on the sensor apparatuses used, in such a way that the orientation and the distance of a wall or an object 2, 3 in relation to the agent coordinate system A can be established and made available. To establish the environment map, the pose of the mobile agent 1 in relation to a fixed reference coordinate system K has to be established. The pose of the mobile agent 1 is then produced from the position shift between the agent coordinate system A of the mobile agent 1 and the reference coordinate system K, and from the rotation difference between the agent coordinate system and the reference coordinate system.

From the pose of the mobile agent 1 in the reference coordinate system, it is then possible, on the basis of the sensor data, to determine the corrected position of the walls 2 and objects 3 in the agent coordinate system.

To establish an environment map that indicates the position of the walls 2 and objects 3 in the reference coordinate system, and to establish the current pose of the mobile agent 1, a method is carried out in the control unit 11, as will be explained in more detail in conjunction with the flow chart in FIG. 2. The method can be implemented as a software and/or hardware algorithm in the controller. The method will be described below by way of example for a 2D environment.

In step S1, using the environment-capturing sensor system 12, sensor data are captured in a capturing step, which sensor data indicate the location (distance and orientation in relation to the agent coordinate system) of one or more walls and objects 2, 3, from the perspective of the mobile agent 1. The sensor data indicate, point by point, the measured coordinates of a distance of walls 2 and obstacles/objects 3 in a respective orientation, such that the relative position of the relevant wall or relevant object 3 in relation to the mobile agent 1 can be determined from the angle of the orientation (in relation to the agent coordinate system) and from the distance. The sensor data can, for example, be determined using LiDAR captures and odometry captures.

In step S2, a reference coordinate system is selected or updated. Reference coordinate systems are selected in accordance with parameterizable criteria. For this purpose, the reference coordinate system is updated when a movement of the mobile agent has taken place. Through the selection of the reference coordinate system, the sensor data can be assigned to a fixed position. Preferably, the reference coordinate system is updated only when a movement of the mobile agent has taken place.

Initially, the reference coordinate system can be defined by the starting pose of the mobile agent 1. The reference coordinate system is re-selected when the pose change of the mobile agent 1 exceeds a threshold value (e.g., 2 m or 60°) in relation to the current, latest valid reference coordinate system. The updated reference coordinate system is then positioned at the current pose of the mobile agent 1.

Figure 3:
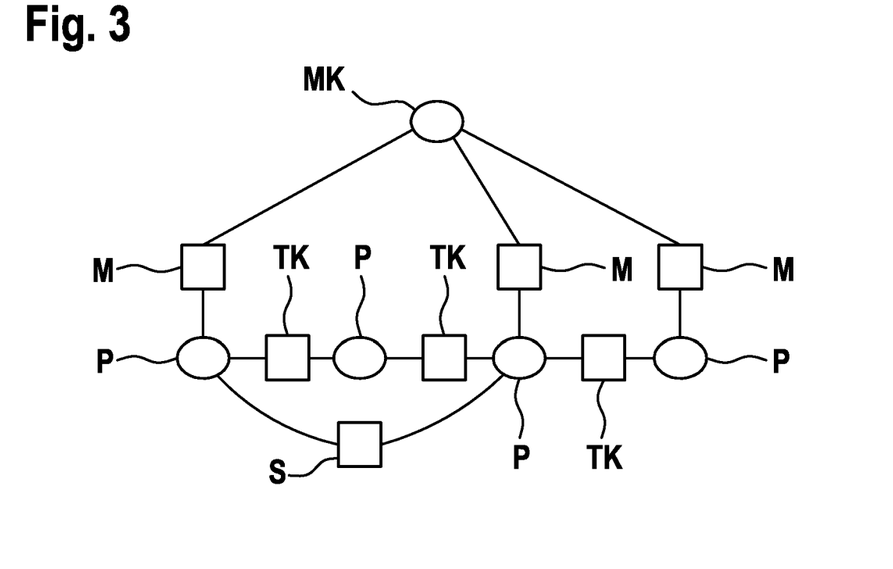
FIG. 3 is a schematic illustration of a graph that is created within the framework of a SLAM algorithm in order to establish the pose of the mobile agent.

Next, a SLAM graph is created or expanded, as shown by way of example in FIG. 3. The SLAM graph is created in order to determine the optimal pose for each pose node by way of optimization.

For this purpose, in step S3, a pose node P (oval) is added to the SLAM graph once a reference coordinate system has been selected. The pose node P represents the measured pose of the mobile agent 1 in relation to the selected reference coordinate system. The measured pose is determined by the pose of the mobile agent 1 as established in the agent coordinate system and by the transformation (position of the origin of the agent coordinate system and the orientation thereof) between the agent coordinate system and the reference coordinate system. The transformation can be determined, for example, by a rotation matrix $$R(\varphi) = \begin{pmatrix} \cos(\varphi) & -\sin(\varphi) \\ \sin(\varphi) & \cos(\varphi) \end{pmatrix}$$

and a position shift $$T(x, y) = \begin{pmatrix} x \\ y \end{pmatrix}.$$

A pose of the mobile agent 1 is defined by a vector: $p \in \mathbb{R}^3$ (i.e., three values) where $p=(x, y, \varphi)'$. In addition to the pose nodes P, a SLAM graph has transformation edges TK. The transformation edges TK (squares) are added in step S4 and each link two pose nodes i and j, which define poses $p_i=(x_i, y_i, \varphi_i)'$ and $p_j=(x_j, y_j, \varphi_j)'$, and can be indicated by a vector $p_{ji}=(x_{ji}, y_{ji}, \varphi_{ji})' \in \mathbb{R}^3$, where the following applies in relation to the rotation R and the translation T:

$R_j = R_{ji} * R_i$, where $R_j = R(\varphi_j), R_{ji} = R(\varphi_{ji}), R_i = R(\varphi_i)$ $T_j = T_i + R_i * T_{ji}$, where $T_i = T(x_j, y_j), T_i = T(x_{ii}, y_{ii}), T_{ji} = T(x_{ji}, y_{ji})$ or $p_i \oplus p_{ji} = p_j$ and $p_{ji} = p_j \ominus p_i$ Transformation edges TK which can result from odometry measurements and the identification of a pose that has already been approached are added to the SLAM graph. These represent the measured relative transformation between two pose nodes P, in particular between the current pose node P and one or more previously reached pose nodes in the SLAM graph.

In addition, when a previously approached position of the mobile agent 1 is recognized, loop closure edges S are inserted between two corresponding pose nodes P to which the same position and/or orientation can be assigned. The loop closure edges S can accordingly indicate a transformation that corresponds to a position change of 0 and a rotation change of 0°.

Loops of this kind can be recognized in a multi-step method. In a first step, nodes are identified that, due to their current estimated pose, are potential candidate nodes for a loop closure edge, e.g., when their distance is below a threshold value, e.g., 1 m. In a second step, an optimal transformation between the potential candidate nodes is established by a scan matching method. In a third step, all the previously established potential candidate nodes are checked for mutual consistency, e.g., by a spectral clustering method. A potential candidate node is inserted into the graph as a loop closure edge only when the check is successful. An example implementation of this method is described in detail, for example, in Edwin B. Olson, 2008, "Robust and Efficient Robotic Mapping," PhD dissertation, Massachusetts Institute of Technology, Cambridge, MA, USA.

In step S5, a check is carried out as to whether a Manhattan orientation can be detected. For this purpose, a method is carried out as explained in more detail below in conjunction with the flow chart in FIG. 4. Depending on the detection of the Manhattan orientation, Manhattan nodes MK and Manhattan edges M are added to the SLAM graph.

In step S6, the SLAM graph is optimized, as described, for example, in Grisetti, G. et al., "A Tutorial on Graph-Based SLAM," IEEE Intelligent Transportation Systems Magazine, 2.4 (2010), pp. 31-43. Carrying out the optimization method is necessary since the sensor data are affected by noise or measurement errors, meaning that there is no precise solution for the SLAM graph. Instead, an error function corresponding to a sum function over all the edges is minimized, in which case, for example, for each edge i, j the error function is defined as $e\_ij=(p_j \ominus p_i) \ominus (m_{ji})$, where $p_j, p_i$ corresponds to the poses of the pose nodes i,j and $m_{ji}$ corresponds to the movement measurement of the transformation edge ij. The overall error function corresponds to $$e=\Sigma(e_{ji}'\Omega_{ji}e_{ji})$$

where $\Omega_{ji}$ corresponds to the inverse of the covariance assigned to the measurements $m_{ji}$.

The error functions are minimized using conventional optimization algorithms, for example Gauss-Newton or Levenberg-Marquardt. The result of the optimization method are poses of the mobile agent 1 that are corrected for the pose nodes of the graph. Therefore, from the last-added pose node P, it is possible to establish the current pose of the mobile agent 1 in the reference coordinate system and, possibly, to create the environment map on the basis of the sensor data. On the basis of the environment map and the current pose of the mobile agent 1, trajectory planning can then be performed, in a conventional manner.

Figure 4:
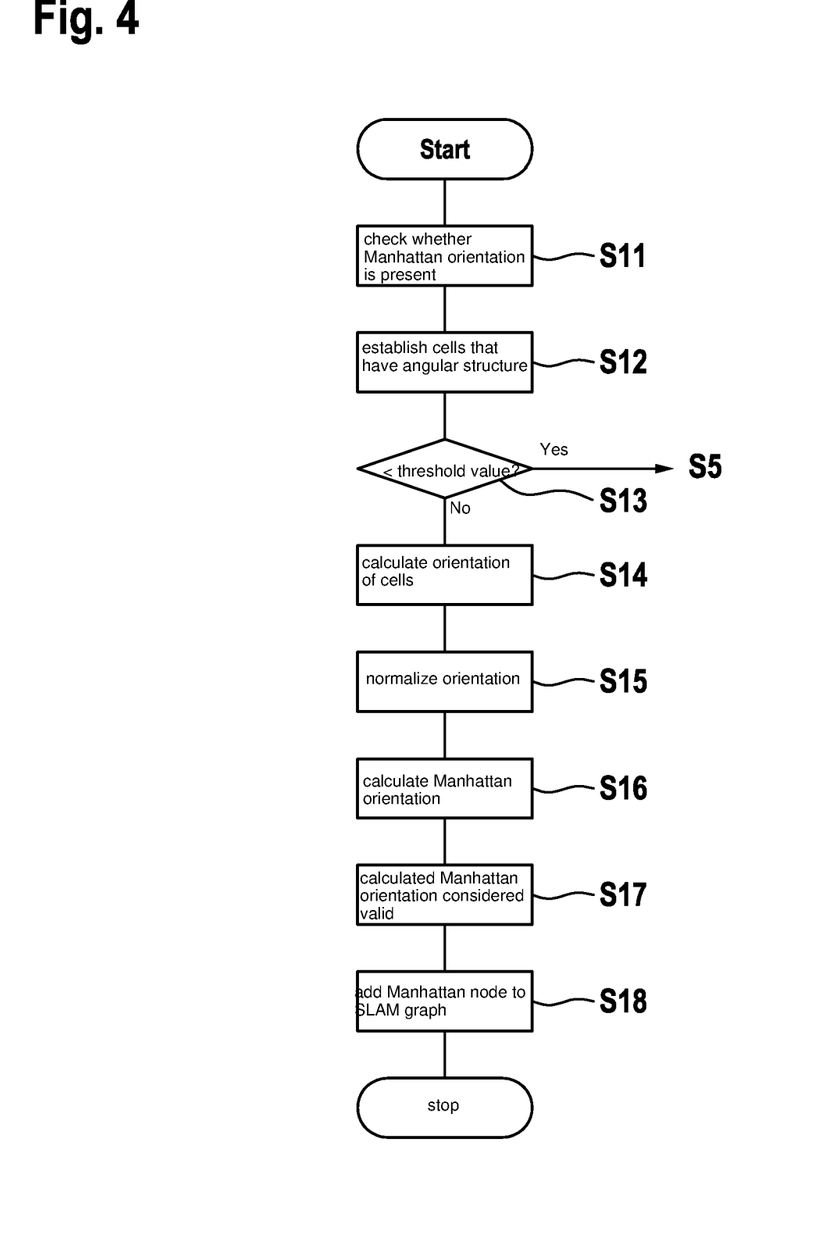
FIG. 4 is a flow chart to illustrate the establishment of a Manhattan orientation, in accordance with an example embodiment of the present invention.

FIG. 4 is a flow chart for illustrating the incorporation of the Manhattan world concept into the above-described method for determining the location of the mobile agent 1 in the reference coordinate system K and the position of the environment map.

In step S11, a check is carried out as to whether a Manhattan orientation is present. For this purpose, the sensor data are grouped into cells as a point cloud of captured positions of walls 2 or objects 3. The cells can, for example, have a predefined size of, e.g., 1 m×1 m or the like. For all the cells of this kind containing at least three captured points, the average and the covariance matrix of the points are calculated. This is carried out on the basis of a method that is conventional and described, for example, as the basis for the so-called NDT-based scan matching method in Biber, W. et al., "The normal distributions transform: A new approach to laser scan matching," Proceedings 2003, IEEE/RSJ International Conference on Intelligent Robots and Systems (IROS 2003), Vol. 3, 2003.

In step S12, the cells that have an angular structure are established. For this purpose, eigenvalues of the covariance matrix are determined. Only cells in which the ratio between the largest and the smallest eigenvalue is greater than a predefined threshold value, for example 100, are retained as the selected cells.

In step S13, a check is carried out as to whether the number of these selected cells is lower than a predefined threshold value. If this is the case (option: yes), the method is terminated without establishing a Manhattan orientation, and the method in FIG. 2 continues by jumping to step S5. Otherwise (option: no), the method continues with step S14.

In step S14, the orientation of the cells is calculated from their respective eigenvector (Ex, Ey) according to the largest eigenvector as a=a tan 2 (Ey, Ex).

In step S15, the orientation is then normalized to a mid-range of −45° to +45°. This normalization is generally referred to as the Manhattan normalization and is carried out by adding or subtracting 90° angles or multiples thereof.

In step S16, the Manhattan orientation is calculated as the dominant orientation from the group of calculated cell orientations of the selected cells. This can be done using various methods.

For example, the similarities s to other orientations can be calculated for each cell orientation in accordance with a method. The similarities between the orientations of the selected cells are calculated in each case, for example as the angular distance d between their Manhattan-normalized orientations in accordance with $s=e^{-d/2\sigma}$, where $\sigma$ can be a selected parameter. The similarity value in relation to a cell is then established by adding up all the similarities s.

The cell orientation having the highest similarity value is set as the Manhattan orientation for this capturing cycle.

In step S17, the calculated Manhattan orientation is considered to be valid when more than a predefined number of cell orientations are within a defined Manhattan-normalized distance from the calculated Manhattan orientation. The Manhattan orientation represents a preferred direction in the environment, which is in a fixed relationship with the reference coordinate system.

In step S18, a Manhattan node, which corresponds to the calculated Manhattan orientation, is added to the SLAM graph. A Manhattan edge is then added for a predefined minimum number of captured detections of Manhattan orientations, said Manhattan edge linking the corresponding pose nodes, which corresponds to the detection, to the newly added Manhattan node.

The Manhattan edge is assigned a Manhattan error function, which is defined as $$e=\text{Manhattan\_normalize}(\varphi_{pose\_edge}+\varphi_{meas}-\varphi_{Manhattan})$$

where $\varphi_{pose\_edge}$ corresponds to the orientation of the pose node, $\varphi_{meas}$ corresponds to the detected Manhattan orientation, $\varphi_{Manhattan}$ corresponds to the status of the Manhattan node, and Manhattan_normalize corresponds to the function of the Manhattan normalization, which calibrates the orientation to a range between −45° and 45°.

Each Manhattan edge is equipped with a robust kernel having an appropriate bandwidth (e.g., 0.1). The robust kernels allow for an accurate estimation of the correct Manhattan angle in the event that some edges having erroneous measurements are included in the graph. This technique corresponds to the state of the art and is described, for example, in Agarwal, P., Tipaldi, G. D., Spinello, L., Stachniss, C., & Burgard, W. (2013, May), "Robust map optimization using dynamic covariance scaling," 2013 IEEE International Conference on Robotics and Automation (pp. 62-69).

Figure 2:
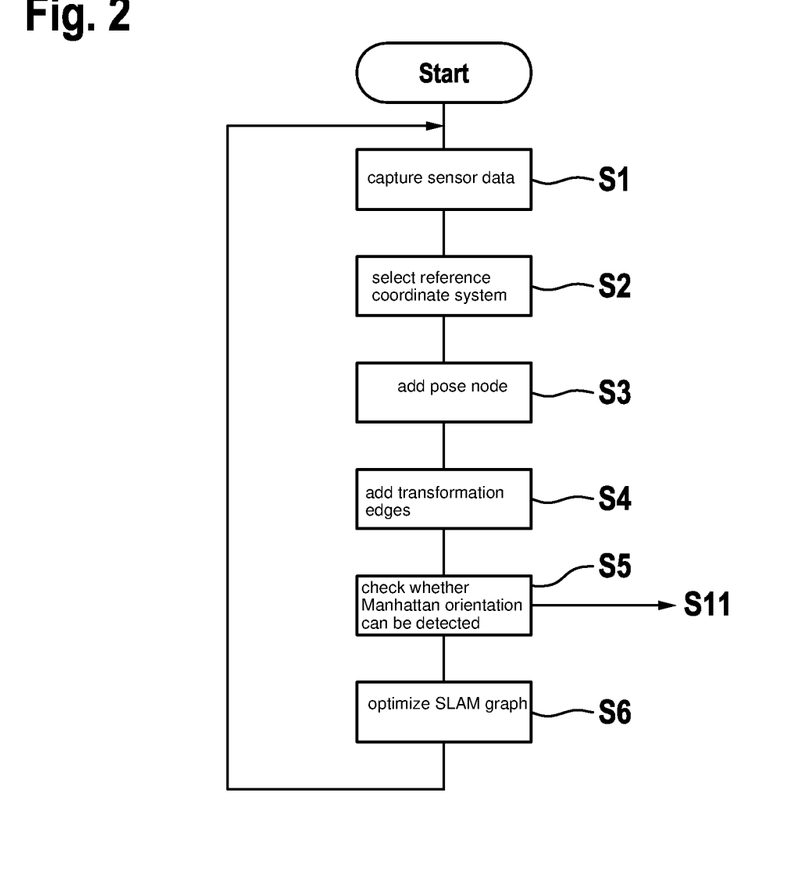
FIG. 2 is a flow chart to illustrate a method for establishing a pose of the mobile agent within an environment, in accordance with an example embodiment of the present invention.

The method then continues with step S6 of the method in FIG. 2.

Figure 5A:
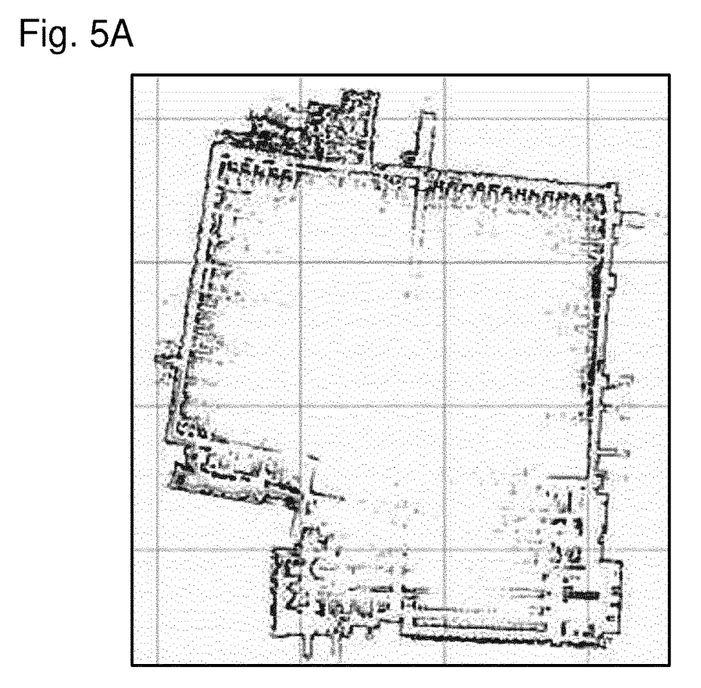
FIG. 5A is a schematic illustration of a capturing of an environment map using a conventional SLAM algorithm.
Figure 5B:
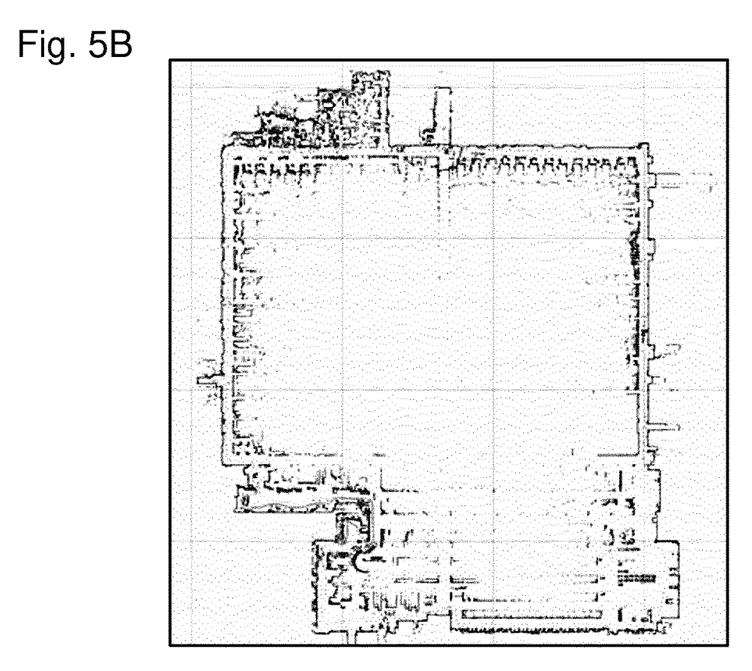
FIG. 5B is an illustration of a captured environment map based on a SLAM algorithm while taking account of a Manhattan world concept, in accordance with an example embodiment of the present invention.

FIG. 5A is a schematic illustration of a capturing of an environment map using a conventional SLAM algorithm. By comparison, FIG. 5B is an illustration of a captured environment map based on a SLAM algorithm while taking account of a Manhattan world concept.

By expanding the SLAM graph with Manhattan nodes and Manhattan edges, a further group of variables to be optimized is added to the optimization problem. Furthermore, an additional error term is generated for each Manhattan edge, which error terms have to be taken into account in the optimization problem.

The above-described method makes it possible to incorporate the Manhattan world concept into a graph-based SLAM algorithm. The incorporation is carried out such that there need be no reference to earlier captured sensor data. The SLAM graph is merely expanded with information resulting from findings of the Manhattan world concept.

What is claimed is:
1. A computer-implemented method for operating a mobile agent in an environment based on a pose of the mobile agent, the method comprising:
   determining a location of the mobile agent using the following steps to operate the mobile agent:
   capturing sensor data regarding walls and/or objects located in the environment, wherein the sensor data indicate an orientation and distance of the walls and/or objects in an agent-based agent coordinate system;

establishing the pose of the mobile agent in the environment using a SLAM algorithm while taking into account a Manhattan orientation, wherein:

the SLAM algorithm provides for a minimization of an error function that is dependent on measurement errors in the sensor data and on the Manhattan orientation, the SLAM algorithm corresponds to a graph-based SLAM algorithm based on a SLAM graph having nodes and transformation edges, wherein the pose nodes each indicate a pose of the mobile agent as established from the sensor data, and wherein the transformation edges between each two pose nodes indicate a pose change, established from the sensor data, between the poses assigned to the two pose nodes, wherein a Manhattan node is added, and at least one Manhattan edge is added between the Manhattan node and at least one of the pose nodes depending on the Manhattan orientation, the SLAM algorithm uses an error function, which is determined from the SLAM graph and takes account of error probabilities assigned to the pose nodes and the Manhattan node and transformation edges and the at least one Manhattan edge, which establishes corrected poses assigned to the pose nodes and the Manhattan node of the SLAM graph, wherein the mobile agent is operated depending on the established pose and/or wherein an environment map is established using a current pose of the mobile agent and the mobile agent is operated depending on the environment map, and wherein the Manhattan orientation is determined depending on a dominant orientation of straight-line structures in adjacent local cells resulting from combining points in a point set that is determined from the sensor data and that indicates coordinates of the captured walls and/or objects.

2. The method as recited in claim 1, wherein, to determine the dominant orientation of the local cells for each cell orientation of a cell, a similarity to all the other cell orientations is established, and a similarity measure is established for each cell as a sum of similarities of the respective cell in relation to the other cells, wherein the Manhattan orientation corresponds to a cell orientation of one of the cells that is selected according to the similarity measure, the similarity measure of the selected cell being a maximum.

3. The method as recited in claim 2, wherein the similarities are determined depending on a Manhattan-normalized orientation difference between two of the cell orientations in each case, wherein the similarities are established depending on an exponential function of a negative Manhattan-normalized difference.

4. The method as recited in claim 1, wherein the Manhattan orientation is taken into account only when more than a predefined number of cell orientations of the cells are located within a Manhattan-normalized orientation difference in relation to the Manhattan orientation.

* * * * *